(12) United States Patent
Cho et al.

(10) Patent No.: US 6,208,504 B1
(45) Date of Patent: Mar. 27, 2001

(54) PORTABLE COMPUTER HAVING A RECTRACTABLE HANDLE

(75) Inventors: Keon-Young Cho, Seoul; Joong-Seup Kim, Suwon, both of (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/066,925

(22) Filed: Apr. 28, 1998

(30) Foreign Application Priority Data

| Apr. 28, 1997 | (KR) | 97-8996 |
| Sep. 9, 1997 | (KR) | 97-46285 |
| Sep. 30, 1997 | (KR) | 97-27149 |

(51) Int. Cl.[7] .................................................. G06F 1/16
(52) U.S. Cl. ...................... 361/683; 361/725; 312/223.1; 312/223.2
(58) Field of Search .......................... 361/683, 724–727; 312/208, 223.1–223.6; D14/106–113

(56) References Cited

U.S. PATENT DOCUMENTS

| 4,294,496 | 10/1981 | Murez | 312/208 |
| 4,895,231 | 1/1990 | Yamaguchi et al. | 190/115 |
| 4,901,261 | 2/1990 | Fuhs | 364/708 |
| 4,926,365 | 5/1990 | Hsieh | 361/394 |
| 4,951,241 | * 8/1990 | Hosoi et al. | 364/708 |
| 5,011,198 | 4/1991 | Gruenberg et al. | 292/41 |
| 5,075,926 | 12/1991 | Jeong | 190/115 |
| 5,162,976 | * 11/1992 | Moore et al. | 361/393 |
| 5,293,300 | 3/1994 | Leung | 361/683 |
| 5,485,922 | 1/1996 | Butcher | 206/576 |
| 5,632,373 | 5/1997 | Kumar et al. | 206/305 |
| 5,642,258 | 6/1997 | Barrus et al. | 361/683 |
| 5,721,668 | 2/1998 | Barrus et al. | 361/683 |
| 6,008,983 | * 12/1999 | Yen | 361/681 |
| 6,016,248 | * 1/2000 | Anzai et al. | 361/683 |

* cited by examiner

Primary Examiner—Gerald Tolin
Assistant Examiner—Hung Van Duong
(74) Attorney, Agent, or Firm—Robert E. Bushnell, Esq.

(57) ABSTRACT

A portable computer includes a main body inside of which a main board and various peripherals are mounted, a handle mounted to the main body, a display portion rotatably mounted to the main body for outputting information on a screen for a user to view, and an indented portion concavely formed on a position of the main body corresponding to a location of the handle, the indented portion being formed such that the handle does not protrude outward when the same is not in use.

19 Claims, 12 Drawing Sheets

PORTABLE COMPUTER HAVING A RECTRACTABLE HANDLE

CLAIM OF PRIORITY

This application makes reference to, incorporates the same herein, and claims all benefits accruing under 35 U.S.C. §119 from an application entitled PORTABLE COMPUTER HAVING A RETRACTABLE HANDLE and earlier filed in the Korean Industrial Property Office on the 28$^{th}$ of Apr. 1997 and there duly assigned Ser. No. 8996/1997, an application entitled PORTABLE COMPUTER HAVING A RETRACTABLE HANDLE and earlier filed in the Korean Industrial Property Office on the 30$^{th}$ of Sep. 1997 and there duly assigned Ser. No. 27149/1997, and an application entitled PORTABLE COMPUTER HAVING A RETRACTABLE HANDLE and earlier filed in the Korean Industrial Property Office on the 9$^{th}$ of Sep. 1997 and there duly assigned Serial No. 46285/1997.

BACKGROUND OF THE INVENTION

1. Technical Field

The present invention relates to a portable computer having a handle and, more particularly, to a portable computer having a retractable handle disposed on a main body of the portable computer, the handle maintaining a retracted state when not in use and able to be projected by the user for convenient portability of the computer.

2. Related Art

Portable computers generally come with a carrying case at the time of purchase. The portable computer is placed inside the carrying case so that it can be transported from one place to another. Although users utilize such a carrying case when transporting their portable computers long distances, it is common for users to carry their portable computers as is (without the use of a carrying case) when moving their computers only a short distance.

Prior carrying cases for portable computers have several drawbacks. For example, such carrying cases add extra weight and bulk to the portable computer, and cause an increase in the overall cost of the portable computer. Furthermore, most users avoid the complicated process of locating the carrying case, placing the portable computer therein, and fastening the carrying case when carrying the portable computer over short distances. Instead, such users simply transport the portable computer by carrying the same as is. In such cases, the computer can be easily dropped by the user, and this can result in significant damage to the computer.

To remedy these problems, portable computers have been designed with a handle attached directly to the computer. However, such structures obstruct the use of the computer as the handle protrudes from the main body, and can detract from the overall attractiveness of the portable computer.

The following patents are considered to be representative of the prior art, and are burdened by the disadvantages set forth herein: U.S. Pat. No. 5,721,668 to Barrus et al., entitled Portable Computer Having A Pivotally Mounted Combined Handle And Power Source, U.S. Pat. No. 5,642,258 to Barrus et al., entitled Computer Accessory Including A Pivotably Mounted Combined Handle And Power Source And Associated Method Of Manufacturing, U.S. Pat. No. 5,632,373 to Kumar et al, entitled Protective Case For Portable Computer, U.S. Pat. No. 5,485,922 to Butcher, entitled Portable Computer Carry Case Assembly, U.S. Pat. No. 5,293,300 to Leung, entitled Portable Computer With A Detachable Handle Including A Battery, U.S. Pat. No. 5,075,926 to Jeong, entitled Handle For Electronic Equipment, U.S. Pat. No. 5,011,198 to Gruenberg et al., entitled Handle Latch Assembly, U.S. Pat. No. 4,926,365 to Hsieh, entitled Portable Computer System, U.S. Pat. No. 4,901,261 to Fuhs, entitled Retractable Handle And Latch For Portable Computers, U.S. Pat. No. 4,895,231 to Yamaguchi et al., entitled Carrying Case, and U.S. Pat. No. 4,294,496 to Murez, entitled Portable Computer Enclosure.

SUMMARY OF THE INVENTION

The present invention has been made in an effort to solve the above problems.

It is an object of the present invention to provide a portable computer having a retractable handle which can be projected for carrying the computer and retracted when the computer is in use, thereby providing the user with a convenient means to transport the portable computer over long and short distances.

To achieve the above object, the present invention provides a portable computer including a main body inside of which a main board and various peripherals are mounted, a handle mounted to the main body, a display portion rotatably mounted to the main body and which outputs information on a screen for the user to view, and an indented portion concavely formed on a position of the main body corresponding to a location of the handle, the indented portion being formed such that the handle does not protrude outward when the same is not in use.

The main body includes a plurality of handle receptors forming cavities.

The handle receptors are formed by: first and second plates disposed inwardly from an outer edge of a top case of the main body and to the right and left of the indented portion, respectively, the first plate having a first handle stopper formed with a semicircular groove in a center portion thereof, and the second plate having a second handle stopper formed with a semicircular groove in a center portion thereof; and third and fourth plates disposed inwardly from an outer edge of a bottom case of the main body and to the right and left of the indented portion, respectively, the third plate having a third handle stopper formed with a semicircular groove in a center portion thereof, and the fourth plate having a fourth handle stopper formed with a semicircular groove in a center portion thereof The first and second plates of the top case correspond to a position of the third and fourth plates of the bottom case, respectively, the first handle stopper of the first plate corresponding to a position of the third handle stopper of the third plate, and the second handle stopper of the second plate corresponding to a position of the fourth handle stopper of the fourth plate.

Further, catch portions are formed on ends of the handle, and the catch portions are positioned in the cavities formed by handle receptors by passing through holes formed by the semicircular grooves of the first and third handle stoppers and by the semicircular grooves of the second and fourth handle stoppers. Reinforcing members are inserted into the catch portions of the handle to provide additional support to the same.

In another aspect, the reinforcing member is formed as a single plate extending across an entire length of the handle and substantially covered by the same. The reinforcing member includes a plurality of grooves provided on ends thereof, the grooves fitting over corresponding protrusions formed in a mold during the molding process, and a plurality of apertures formed in the reinforcing member such that material, while in a liquid state, can fully penetrate an underside of the reinforcing member and fill the mold. Further, the reinforcing member is arcuate such that the handle maintains this shape and a predetermined degree of elasticity.

In yet another aspect, the present invention provides a portable computer including: a main body inside of which a main board and various peripherals are mounted and having a plurality of handle stoppers, each handle stopper having a hole and the handle stoppers forming cavities; a handle mounted to the main body and having catch portions formed on opposite ends thereof, the catch portions being positioned in the cavities formed by the handle stoppers; a display portion rotatably mounted to the main body and which outputs information on a screen for the user to view; and an indented portion concavely formed on a position of the main body corresponding to a location of the handle, the indented portion being formed such that the handle does not protrude outward when the same is not in use.

In still yet another aspect, the present invention provides a portable computer including: a handle, on each end of which is formed a catch portion; and a main body having two handle stoppers provided at predetermined locations, the handle stoppers forming holes through which the catch portions of the handle are inserted. In addition, the catch portions can be mushroom-shaped, and the handle extends outwardly from the main body when in use, and remains substantially flush to an outer side of the main body when not in use.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
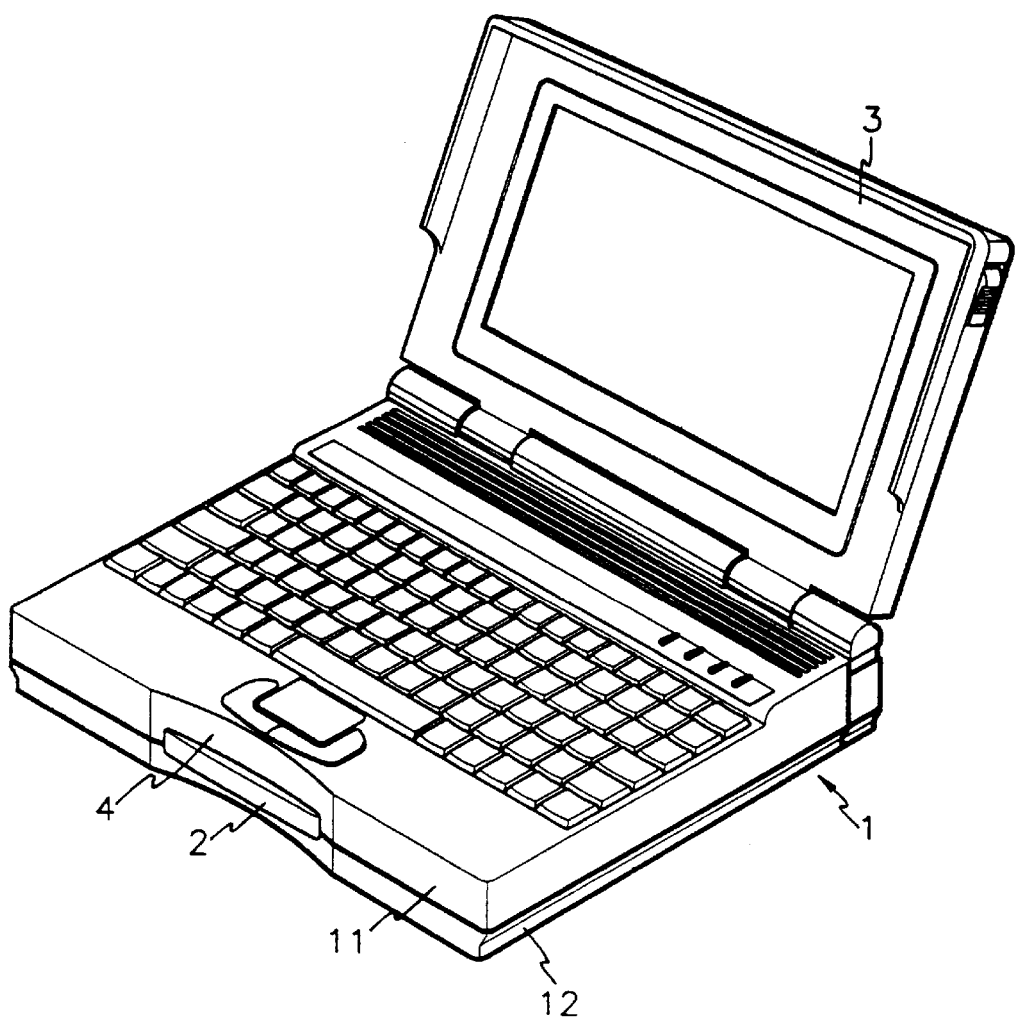
FIG. 1 is a perspective view of a portable computer having a retractable handle according a first preferred embodiment of the present invention.

Preferred embodiments of the present invention will now be described in detail with reference to the accompanying drawings.

Certain terminology will be used in the following description for convenience and reference only and will not be limiting. The words "right" and "left" will designate directions in the drawings to which reference is made.

Figure 15:
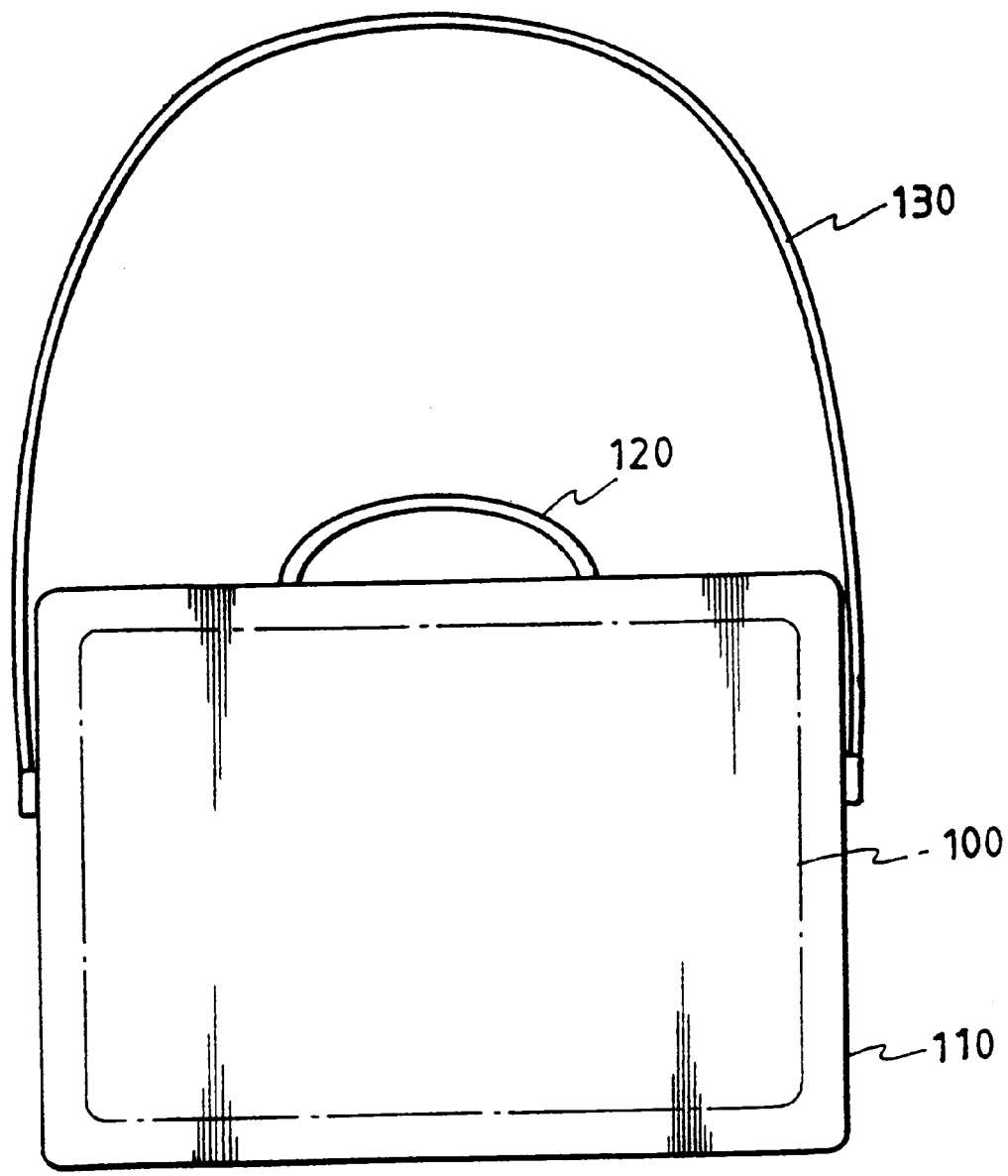
FIG. 15 is a perspective view of a prior carrying case for a portable computer.

As shown in FIG. 15, a prior carrying case for a portable computer 100 includes a bag 110 inside of which the portable computer 100 is placed, a handle 120 provided on an upper end of the bag 110, and a shoulder strap 130, each end of which is fixed on opposing side surfaces of the bag 110. The user either grasps the handle 120 or uses the shoulder strap 130 when transporting the portable computer 100.

However, the above carrying case has many drawbacks. That is, the carrying case adds extra weight and bulk to the portable computer, and acts to increase overall costs of the same. Further, as most users avoid the complicated process of locating the carrying case, placing the portable computer therein, and fastening the carrying case when carrying the portable computer short distances, and instead simply transport the portable computer by carrying the same as is, the computer can be easily dropped by the user, resulting in significant damage.

To remedy these problems, portable computers have been designed having a handle attached directly on the computer. However, such structures obstruct the use of the computer as the handle protrudes from the main body, and detract from the overall attractiveness of the portable computer.

As shown in FIG. 1, a portable computer according to a first preferred embodiment of the present invention comprises: a main body 1 inside of which a main board and various peripherals are mounted; a handle 2 disposed on a front of the portable computer and made of synthetic resin, rubber, or other such flexible material; a display portion 3 rotatably mounted to the main body 1 and which outputs information on a screen for the user to view; and an indented portion 4 concavely formed on a front of the portable computer corresponding to a location of the handle 2, the indented portion 4 being formed such that the handle 2 does not protrude outward when the same is not in use.

Figure 2:
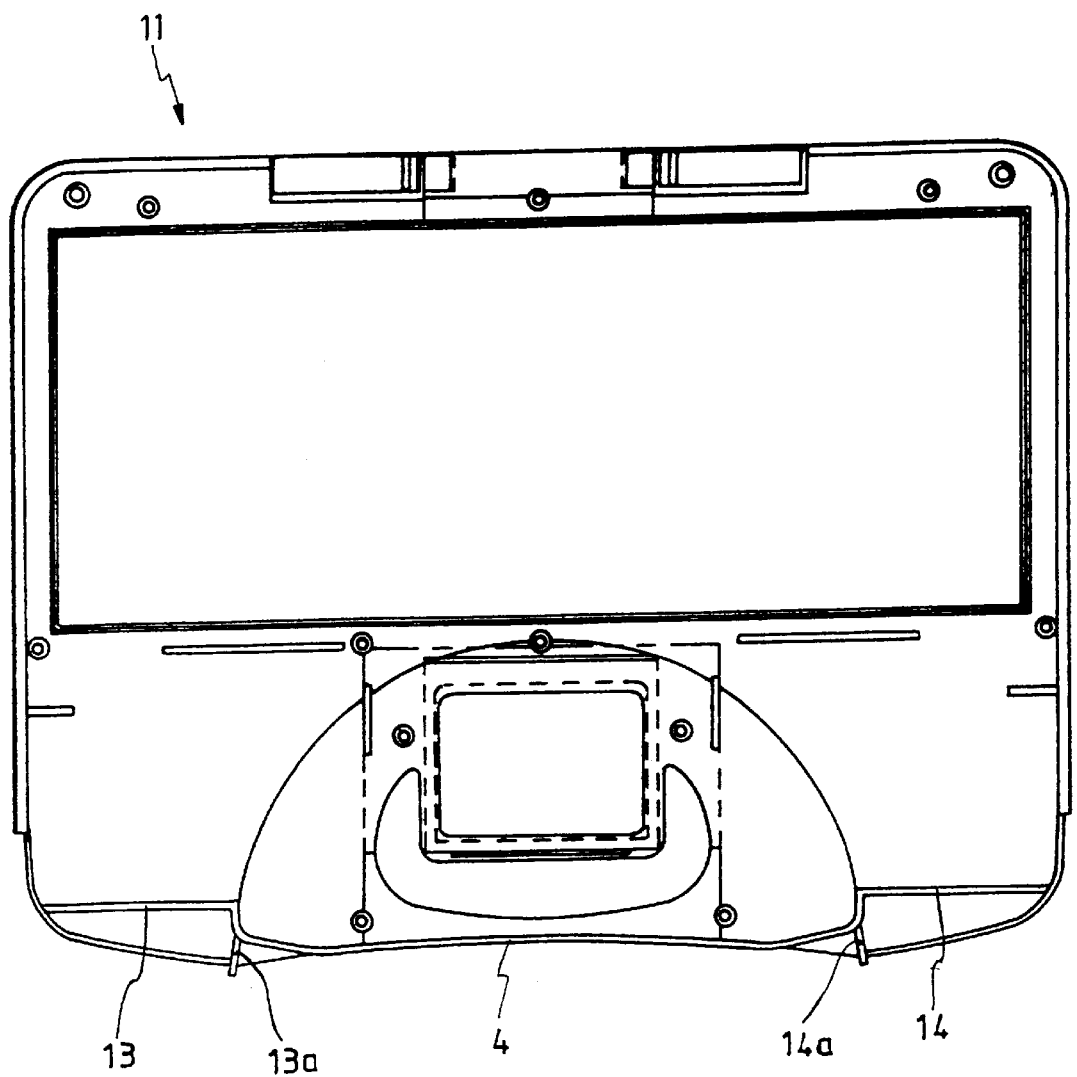
FIG. 2 is a rear view of a top case shown in FIG. 1.
Figure 3:
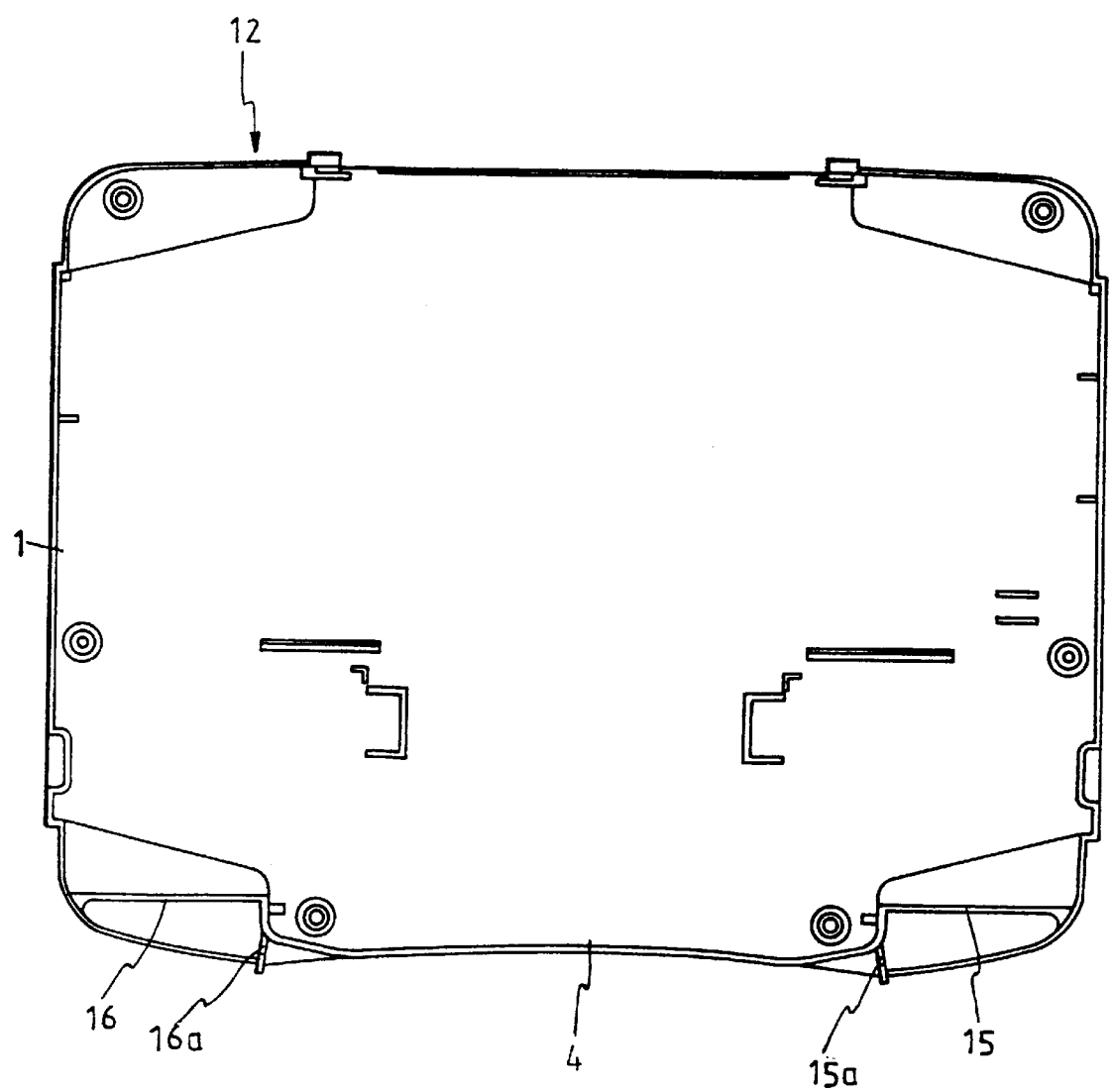
FIG. 3 is a plan view of a bottom case shown in FIG. 1.

The main body 1 includes a top case 11 and a bottom case 12, the bottom case 12 being coupled to the top case 11 by screws. As shown in FIG. 2, the top case 11 includes first and second plates 13 and 14 disposed inwardly from an outer edge of the top case 11 and to the right and left of the indented portion 4, respectively. The first plate 13 has a first handle stopper 13a formed with a semicircular groove in a center portion thereof, and the second plate 14 has a second handle stopper 14a formed with a semicircular groove in a center portion thereof Further, as shown in FIG. 3, the bottom case 12 includes third and fourth plates 15 and 16 disposed inwardly from an outer edge of the bottom case 12 and to the right and left of the indented portion 4, respectively. The third plate 15 has a third handle stopper 15a formed with a semicircular groove in a center portion thereof, and the fourth plate 16 has a fourth handle stopper 16a formed with a semicircular groove in a center portion thereof.

When assembled, the first and second plates 13 and 14 of the top case 11 correspond to a position of the third and fourth plates 15 and 16 of the bottom case 12, respectively. Further, the first handle stopper 13a of the first plate 13 corresponds to a position of the third handle stopper 15a of the third plate 15, and the second handle stopper 14a of the second plate 14 corresponds to a position of the fourth handle stopper 16a of the fourth plate 16. Accordingly, with the bottom case 12 coupled to the top case 11 with screws, a cavity is defined to the right of the indented portion 4 (in FIG. 1) by the main body 1, the first and third plates 13 and 15, and the first and third handle stoppers 13a and 15a; and a cavity is defined to the left of the indented portion 4 (in FIG. 1) by the main body 1, the second and fourth plates 14 and 16, and the second and fourth handle stoppers 14a and 16a. Here, the cavities are in communication with an outside of the portable computer by a hole formed by the semicircular grooves of the first and third handle stoppers 13a and 15a, and by a hole formed by the semicircular grooves of the second and fourth handle stoppers 14a and 16a.

Figure 4:
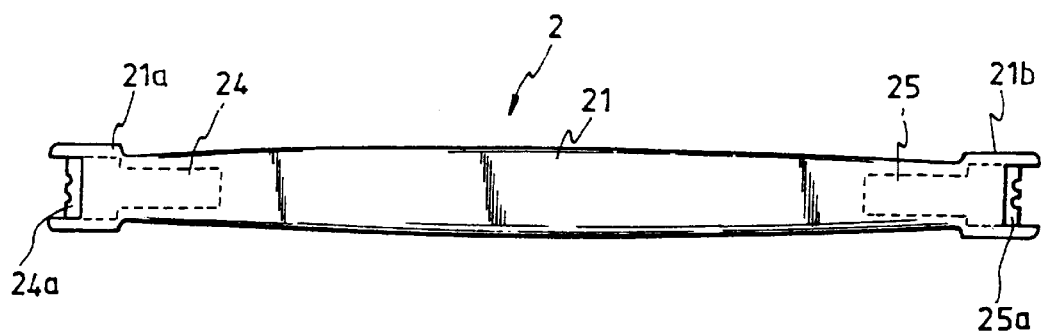
FIG. 4 is a plan view of the handle shown in FIG. 1.
Figure 5:
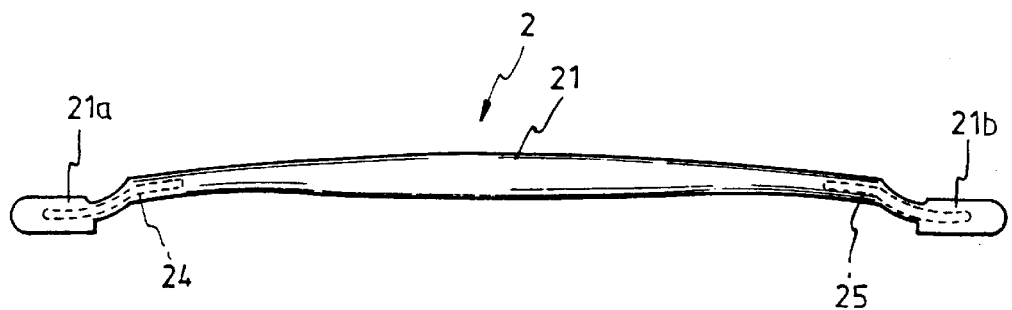
FIG. 5 is a side view of the handle shown in FIG. 1.

Referring now to FIGS. 4 and 5, respectively illustrating a plan view and a side view of the handle 2, the handle 2 includes a main belt 21 having a catch portion 21a formed on a left end of the same and a catch portion 21b formed on a right end of the same, and reinforcing members 24 and 25. The reinforcing members 24 and 25 are inserted into the catch portions 21a and 21b, respectively, and provide additional support to the main belt 21. Further, mold extensions 24a and 25a are formed on distal ends of the reinforcing members 24 and 25, respectively, the mold extensions 24a and 25a protruding outward from the main belt 21 and being used to facilitate the mold process.

The left and right ends of the handle 2 are provided in the cavities formed to the left and right of the indented portion 4, respectively. Here, the left and right ends of the handle 2 are able to freely move inside the cavities, but are limited in their movement toward the indented portion 4 by the first and third handle stoppers 13a and 15a on the right side and by the second and fourth handle stoppers 14a and 16a on the left side. That is, the catch portion 21a formed on the left end of the main belt 21 is blocked from further movement toward the indented portion 4 by the second and fourth handle stoppers 14a and 16a, and the catch portion 21b formed on the right end of the main belt 21 is blocked from further movement toward the indented portion 4 by the first and third handle stoppers 13a and 15a.

Figure 6:
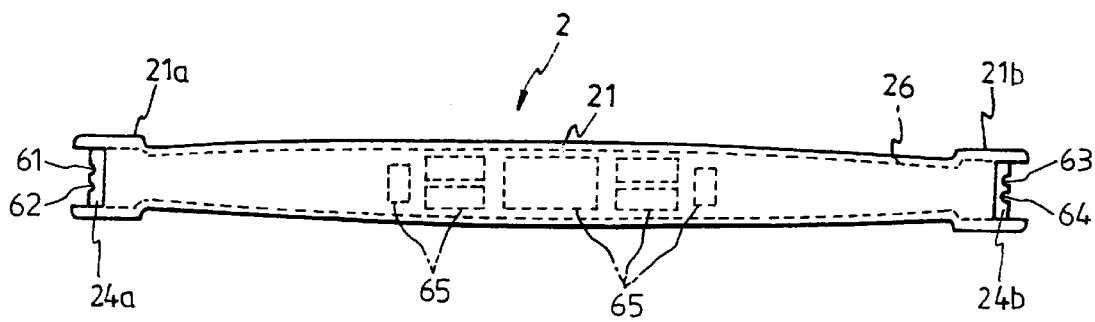
FIG. 6 is a plan view of a modified example of the handle shown in FIG. 1.
Figure 7:
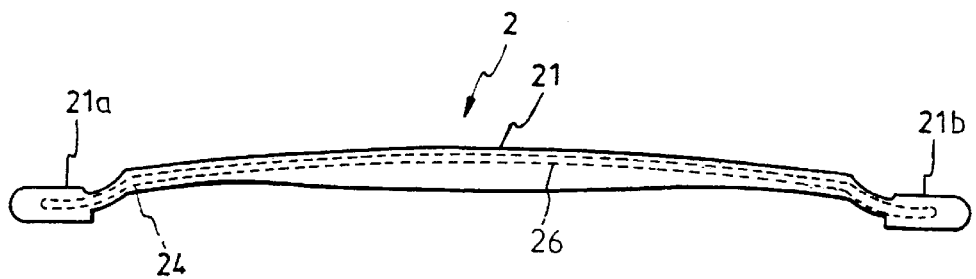
FIG. 7 is a side view of the handle shown in FIG. 6.
Figure 8:
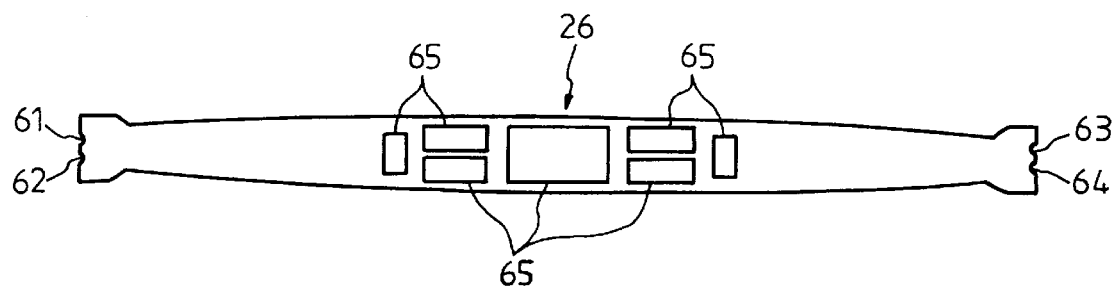
FIG. 8 is a plan view of a reinforcing member of the handle shown in FIG. 6.
Figure 9:
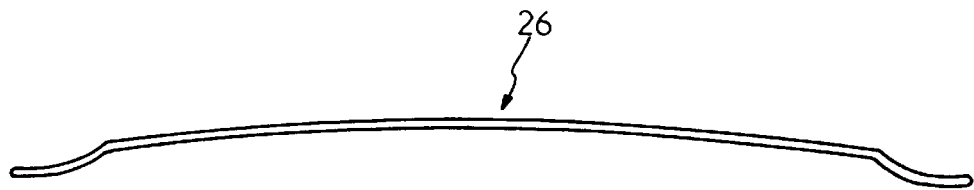
FIG. 9 is a side view the reinforcing member of the handle shown in FIG. 6.

FIGS. 6 and 7 are a plan view and a side view, respectively, of a modified example of the handle 2 according to the first embodiment of the present invention. As shown in the drawings, a reinforcing member 26 of the modified example is formed as a single plate extending across an entire length of the handle 2 and substantially covered by the same. The reinforcing member 26 of the modified example is also illustrated in FIGS. 8 and 9.

The reinforcing member 26 includes a plurality of grooves 61, 62, 63 and 64 provided on ends of the reinforcing member 26. The grooves 61, 62, 63 and 64 fit over corresponding protrusions formed in a mold (not shown) during the molding process such that the formation process of the handle 2 remains consistent for each handle 2. Further, a plurality of apertures 65 is formed in the reinforcing member 26 such that material, while in a liquid state, used for the main belt 21 can fully penetrate an underside of the reinforcing member 26 and fill the mold. In addition, as shown in FIG. 9, the reinforcing member 26 is arcuate such that the handle 26 maintains this shape and a predetermined degree of elasticity.

The assembly and operation of the handle 2 of the portable computer structured as in the above, according to the first embodiment of the present invention, will be described hereinafter.

Figure 10:
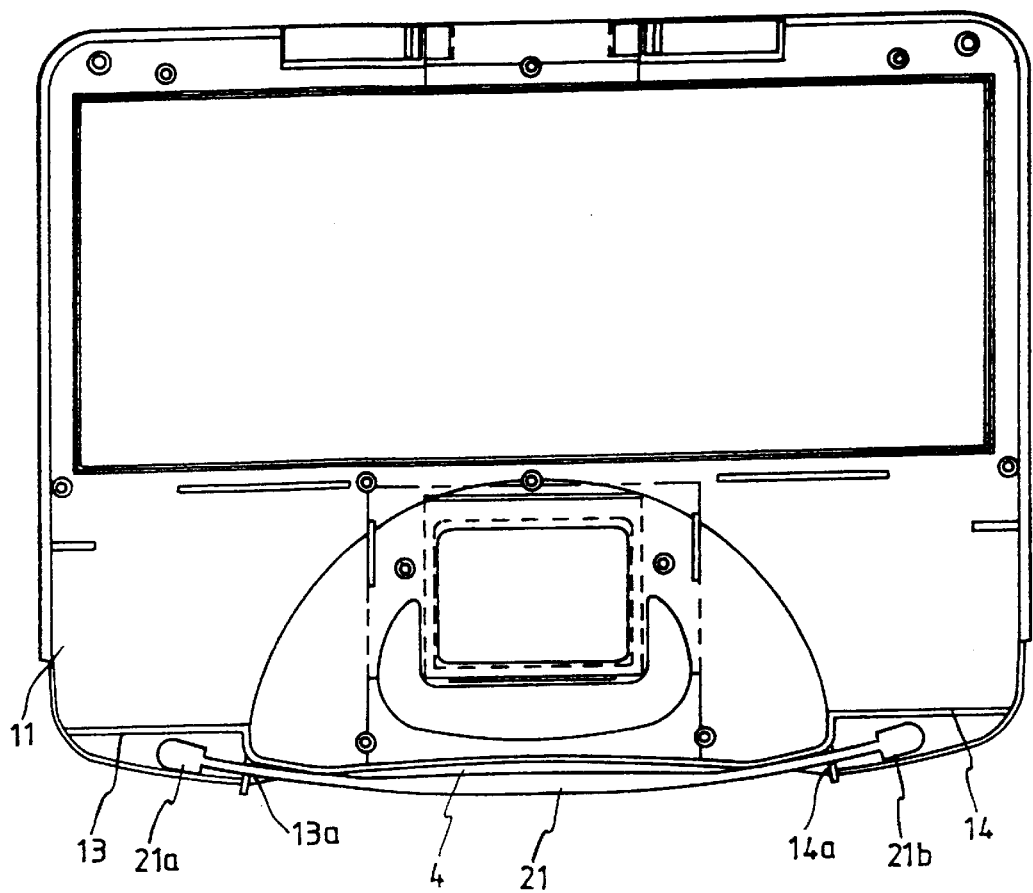
FIG. 10 is a rear view of the top case shown in FIG. 1 with the handle of the first embodiment mounted therein.
Figure 11:
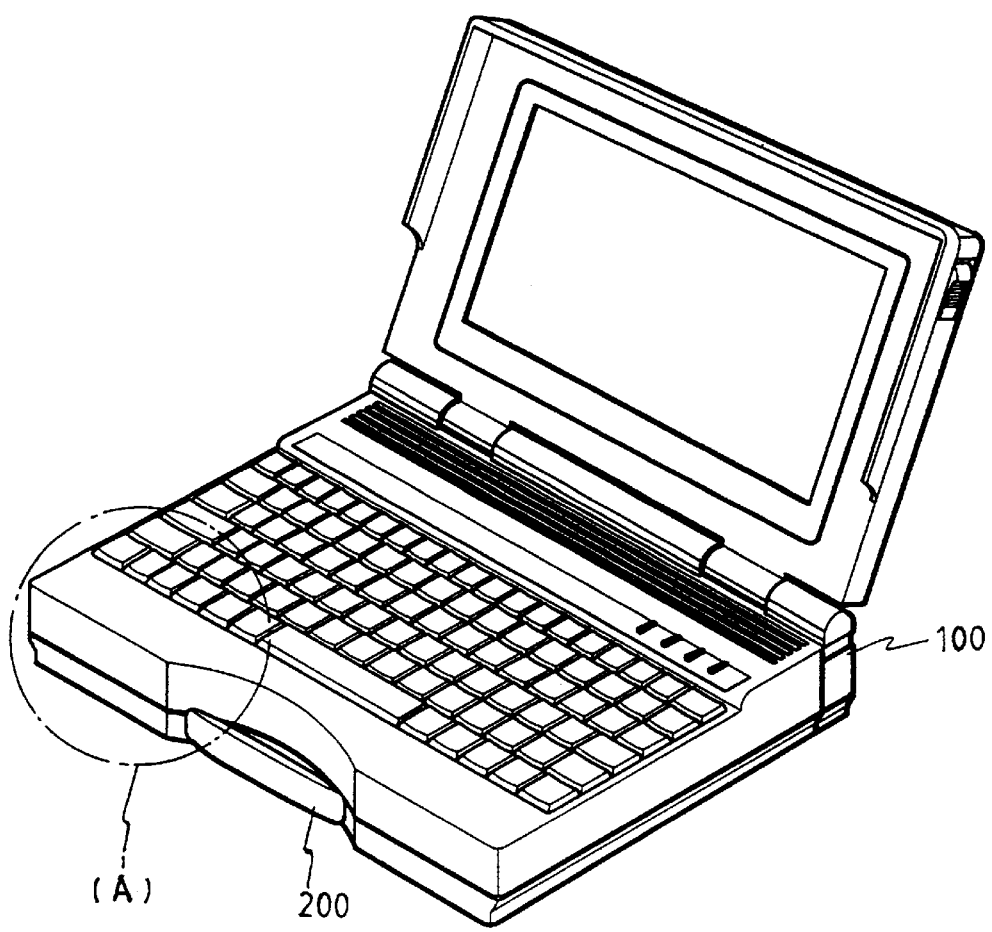
FIG. 11 is a perspective view a portable computer having a retractable handle according a second preferred embodiment of the present invention.
Figure 12:
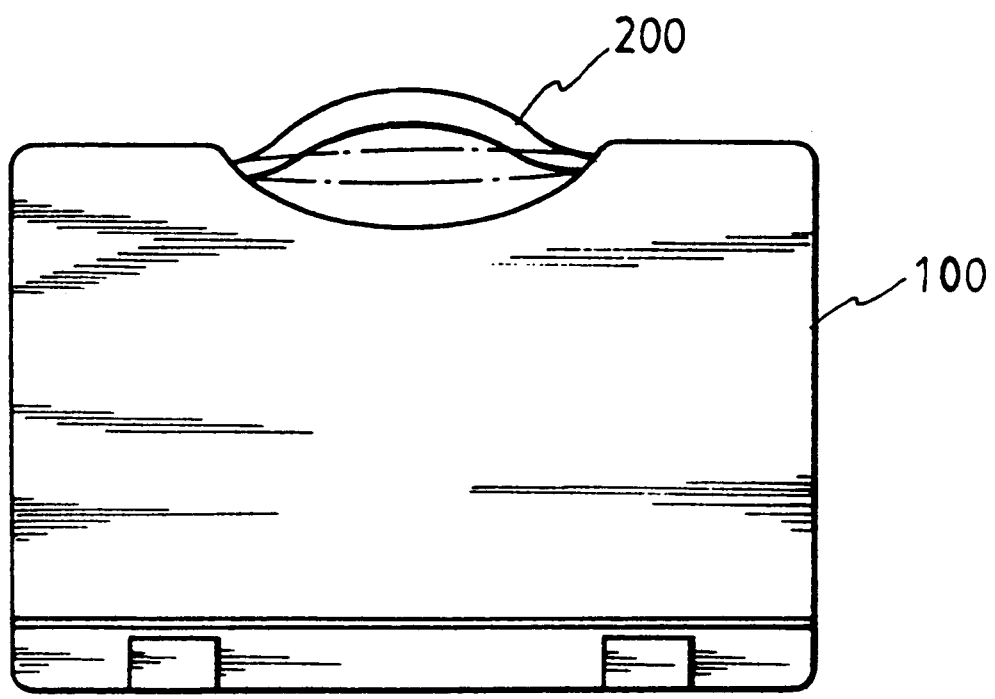
FIG. 12 is a top view of the portable computer shown in FIG. 11 illustrating protruded and retracted states of the handle.
Figure 13A:
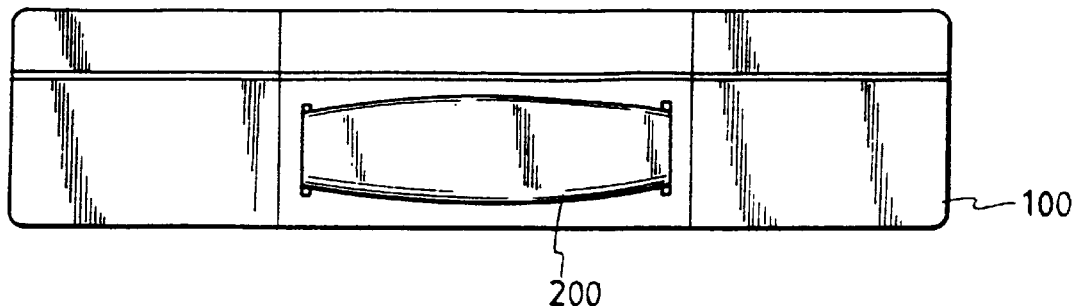
FIG. 13A is a plan view of the handle shown in FIG. 11 in a state mounted to the portable computer.
Figure 13B:
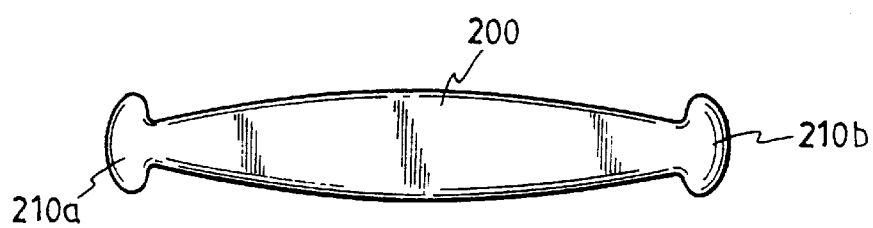
FIG. 13B is a plan view of the handle shown in FIG. 11.
Figure 13C:
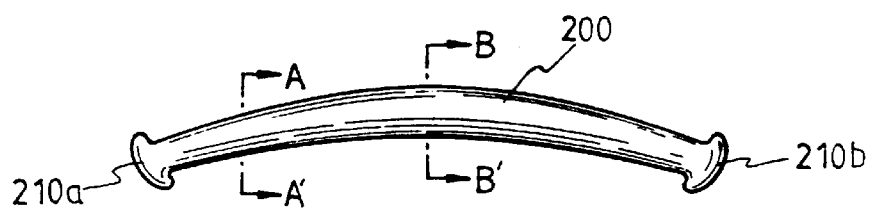
FIG. 13C is a side view of the handle shown in FIG. 11.
Figure 13D:
FIG. 13D illustrates views taken along lines A—A and B—B of FIG. 13C.

First, with regard to the assembly of the portable computer, the handle 2 is placed on the top case 11 as shown in FIG. 10. That is, the ends of the handle 2, including the catch portions 21a and 21b, are placed in the cavities formed to the left and right of the indented portion 4. Accordingly, two points of the handle 2 come to be positioned in the semicircular grooves of the first and second handle stoppers 13a and 14a. Next, with the handle 2 positioned in the top case 11, the bottom case 12 is coupled to the top case 11 using screws, thereby completing the assembly of the main body 1.

When using the portable computer structured as in the above, as the handle 2 has a predetermined degree of elasticity such that the main belt 21 of the handle 2 is pressed in a direction toward the indented portion 4, the handle 2 remains substantially flush with the front of the main body 2. Namely, the ends of the handle 2 slide deeply into the cavities by an inward force received from the predetermined elasticity of the handle 2. As a result, the handle 2 does not obstruct the operation of the portable computer.

However, when a user wants to transport the portable computer, the user pulls the handle 2 in a direction away from the main body 1 such that the handle 2 extends outward, thereby providing sufficient space for the user to insert his or her hand between the main body 1 and the handle 2, and to grasp the same. In more detail, as the ends of the handle 2 are able to freely move within the cavities, when the handle 2 is pulled in a direction away from the main body 1, the ends of the handle 2 slide in a direction toward the indented portion 4 until the catch portions 21a and 21b contact the first and second handle stoppers 13a and 14a and the third and fourth handle stoppers 15a and 16a, respectively. Accordingly, the handle 2 is prevented from further extension away from the main body 1 but is projected therefrom to a sufficient degree such that the handle 2 can be grasped by the user.

Referring now to FIGS. 11–14, illustrating various views of a portable computer according to a second preferred embodiment of the present invention, the portable computer comprises a main body 100 having handle stoppers 220 formed on left and right sides toward a front of the main body 100, each handle stopper 220 having a hole, and a handle 200 having catch portions 210a and 210b formed on opposite ends thereof, each catch portion 210a and 210b being positioned in cavities formed by the handle stoppers 220.

The handle 200 is made of synthetic resin, rubber, or other such materials having elastic properties, and the catch portions 210a and 210b of the handle 200 expand from a width of the same to resemble the shape of a mushroom. The ends of the handle 200 are positioned in the cavities formed by the handle stoppers 220 and are able to move freely therein, and the catch portions 210a and 210b prevent the handle 200 from being removed from the main body 100. Accordingly, the handle 200 extends outwardly from the main body 100 when in use, and remains substantially flush to an outer side of the main body 100 when not in use as shown by the phantom lines 200a of FIG. 12.

Figure 14A:
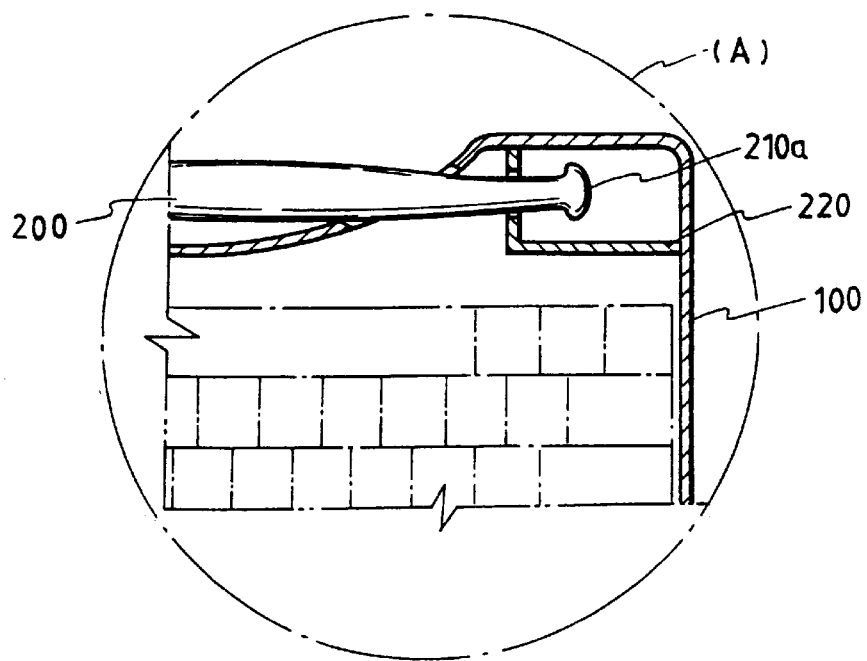
FIG. 14A is a partial sectional view of the portable computer shown in FIG. 11 in a state where the handle is retracted.
Figure 14B:
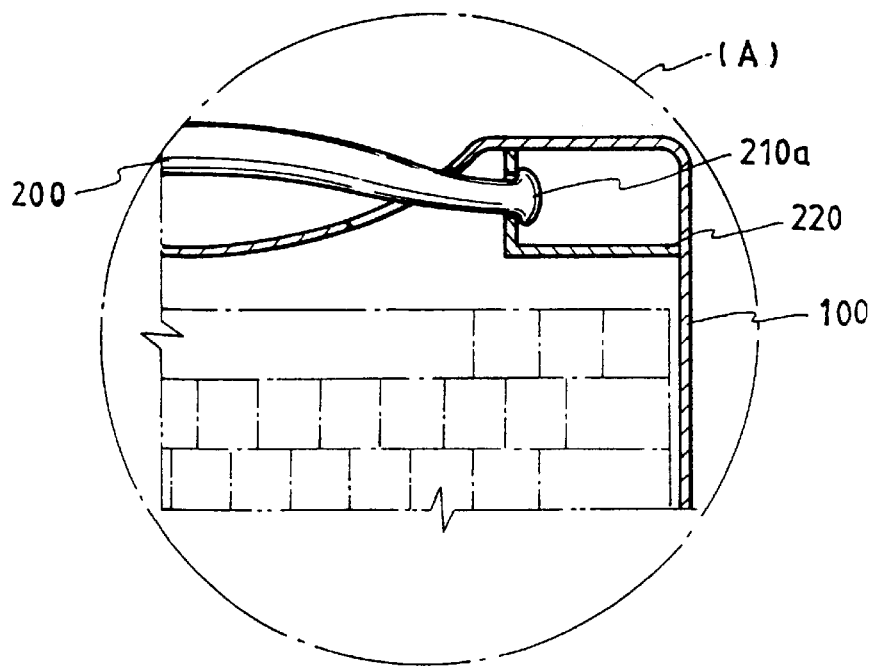
FIG. 14B is a partial sectional view of the portable computer shown in FIG. 11 in a state where the handle is protruded.

In more detail with reference to FIGS. 14A and 14B, when the handle 200 is not in use, the catch portion 210a is positioned loosely in the cavity formed by the handle stopper 220, but when the handle 200 is being used to carry the portable computer, as the handle 200 is pulled away from the main body 100 by the user, the catch portion 210a slides inside the cavity until it makes contact with the handle stopper 220. Here, as the catch portion 210a is larger in area than the hole formed by the handle stopper 220, the handle 200 is no longer able to be pulled out further from the main body 100, and is prevented from being disconnected from the same.

In the portable computer having a retractable handle structured and operating as in the above embodiments, as the handle maintains a retracted state when not in use and is able to be projected by the user for transporting the computer, convenient portability of the computer is provided without the use of a separate carrying case, and there is no hindrance to the normal operation of the computer as in prior portable computers having an attached handle.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A portable computer, comprising:
   a main body;
   a handle mounted on said main body and having a first catch portion at one end of said handle and a second catch portion at another end of said handle;
   an indented portion concavely formed on a position of the main body corresponding to a location of the handle, the indented portion being formed such that the handle does not protrude outwardly when the handle is not in use;
   a first handle receptor provided on one side of said indented portion for receiving said first catch portion; and
   a second handle receptor provided on another side of said indented portion for receiving said second catch portion;
   wherein said first and second catch portions slide within said first and second handle receptors, respectively between first positions furthest from said indented portion and second positions closest to said indented portion.

2. The portable computer of claim 1, wherein said main body comprises a bottom case and a top case connected in hinge-like fashion to said bottom case, said top case including a display portion rotatably mounted to the main body for outputting information on a screen for a user to view.

3. The portable computer of claim 1, wherein said handle is an elastic member which extends outwardly from the main body of the portable computer when pulled by the user, and automatically retracts in a direction toward the main body when not manipulated by the user such that the handle does not protrude from the same.

4. The portable computer of claim 1, wherein the first and second handle receptors are formed by first and second plates, respectively, disposed inwardly from an outer edge of a top case of the main body and disposed to a right side and a left side, respectively, of the indented portion, the first plate having a first handle stopper formed with a semicircular groove in a center portion thereof, and the second plate having a second handle stopper formed with a semicircular groove in a center portion thereof; and
   wherein the handle receptors are further formed by third and fourth plates disposed inwardly from an outer edge of a bottom case of the main body and disposed to the right side and the left side, respectively, of the indented portion, the third plate having a third handle stopper formed with a semicircular groove in a center portion thereof, and the fourth plate having a fourth handle stopper formed with a semicircular groove in a center portion thereof.

5. The portable computer of claim 1, wherein the first and second handle receptors are formed by first and second plates, respectively, disposed inwardly from an outer edge of one of a top case and a bottom case of the main body and disposed to a right side and a left side, respectively, of the indented portion, the first plate having a first handle stopper formed with a semicircular groove in a center portion thereof, and the second plate having a second handle stopper formed with a semicircular groove in a center portion thereof.

6. The portable computer of claim 4, wherein the first and second plates of the top case correspond to a position of the third and fourth plates, respectively, of the bottom case, the first handle stopper of the first plate corresponds to a position of the third handle stopper of the third plate, and the second handle stopper of the second plate corresponds to a position of the fourth handle stopper of the fourth plate.

7. The portable computer of claim 5, wherein said first and second catch portions are positioned in the first and second handle receptors, respectively, by passing through holes formed by the semicircular grooves of said first and second handle stoppers, respectively.

8. The portable computer of claim 6, wherein said first and second catch portions are positioned in the first and second handle receptors, respectively by passing through holes formed by the semicircular grooves of the first and third handle stoppers, respectively, and by the semicircular grooves of the second and fourth handle stoppers, respectively.

9. The portable computer of claim 8, wherein reinforcing members are inserted into the first and second catch portions of the handle to provide additional support to the first and second catch portions.

10. The portable computer of claim 8, wherein a reinforcing member is inserted in the handle, the reinforcing member being formed as a single plate extending across an entire length of the handle and substantially covered by the handle.

11. The portable computer of claim 10, wherein the reinforcing member includes a plurality of grooves provided on ends thereof, the grooves fitting over corresponding protrusions formed in a mold during a molding process, and a plurality of apertures formed in the reinforcing member such that molding material while in a liquid state, can fully penetrate an underside of the reinforcing member and fill the mold.

12. The portable computer of claim 10, wherein the reinforcing member is arcuate such that the handle maintains an arcuate shape and a predetermined degree of elasticity.

13. The portable computer of claim 11, wherein the reinforcing member is arcuate such that the handle maintains an arcuate shape and a predetermined degree of elasticity.

14. A portable computer, comprising:

a main body having first and second handle stoppers, each of said first and second handle stoppers having a hole formed therein, said first and second handle stoppers forming respective cavities in said main body;

a handle mounted on said main body and having catch portions formed on opposite ends of said handle, each of said catch portions being positioned in the cavity formed by a respective one of said first and second handle stoppers; and an indented portion concavely formed between said first and second handle stoppers at a location on said main body corresponding to a location of the handle, said indented portion being formed such that the handle does not protrude outwardly when the handle is not in use.

15. The portable computer of claim 14, wherein each of said catch portions is disposed in a respective one of said cavities formed by said first and second handle stoppers, respectively, and wherein said each of said catch portions slides within said respective one of said cavities between a first position furthest from said indented portion and a second position closest to said indented portion.

16. The portable computer of claim 15, wherein, when said each of said catch portions is in said first position furthest from said indented portion, said handle is fully extended and lies flush with said main body of said portable computer, and when said each of said catch portions is in said second position closest to said indented portion, said handle is not fully extended and protrudes from said main body of said portable computer.

17. A portable computer, comprising:

a handle having two ends and two catch portions, each of said two catch portions being formed on a respective one of said two ends of said handle; and a main body having two handle stoppers provided at predetermined locations on said main body, each of said two handle stoppers forming a hole through which a respective one of said two catch portions of said handle is inserted;

said main body also having two handle receptors, each of said two handle receptors comprising a cavity formed in said main body and on an outer side of a respective one of said two handle stoppers, each of said two catch portions being received in a respective one of said two handle receptors when said each of said two catch portions is inserted through said hole formed by said respective one of said two handle stoppers.

18. The portable computer of claim 17, wherein each of said two catch portions is mushroom-shaped, said handle extending outwardly from said main body when in use, and said handle remaining substantially flush with an outer contour of said main body when said handle is not in use.

19. The portable computer of claim 17, wherein said each of said two catch portions slides within said respective one of said two handle receptors between a first position at which said handle is fully extended and lies flush with the main body of the portable computer, and a second position in which said handle is not fully extended and protrudes from the main body of said portable computer.

* * * * *